TIME

FIG. 3

INVENTOR.
BERNHARD A. LEINFELDER
BY
*John A. Lahive, Jr.*
ATTORNEYS

United States Patent Office 3,519,841
Patented July 7, 1970

3,519,841
PHASE SENSITIVE DETECTOR
Bernhard A. Leinfelder, Cochituate, Mass., assignor, by mesne assignments, to Millipore Corporation, Bedford, Mass., a corporation of Massachusetts
Filed Oct. 23, 1967, Ser. No. 677,300
Int. Cl. H03k *5/20;* H03d *3/18*
U.S. Cl. 307—232                                6 Claims

ABSTRACT OF THE DISCLOSURE

A phase sensitive detector employing a pair of differential amplifiers the outputs of which are connected through solid state switching devices to a pair of load elements. A reference signal is coupled across the input terminals of one of the differential amplifiers. The difference between the voltages appearing across the two load elements serves as the output signal which is linearly related in amplitude to that component of an input signal which is in phase with the reference signal.

FIELD OF THE INVENTION

This invention relates in general to phase sensitive detectors and more particularly to a phase sensitive detector circuit operative over a wide range of input signal frequencies and amplitudes.

BACKGROUND OF THE INVENTION

Phase sensitive detector circuits are circuits that provide an output signal in response only to that component of a varying input signal which is in phase with a reference signal. The output signal is generally a single polarity signal having an amplitude proportional to the inphase component of an alternating polarity input signal. There are a wide number of applications for phase sensitive detectors including use in alternating current bridge circuits for the measurement of an unknown impedance, and modulation, demodulation, mixing, gating, and switching of signals. One phase sensitive detector circuit known in the art is the diode ring bridge demodulator, which includes four semiconductor diodes and two transformers with center tapped secondary windings. This circuit, however, has a limited frequency response and requires a relatively high amplitude reference signal, typically in the order of two volts. Additionally the transformers make this a relatively high cost circuit. Other phase sensitive detector circuits employ transistors operated in the saturated switching mode in a number of configurations. These circuits also are characterized by a limited frequency response, chiefly due to the turnoff time of these switching transistors. In general the prior art phase sensitive detectors experience a limited frequency response and are liimted in terms of the range of amplitude of input signals for which the circuit can provide a linearly related output signal.

SUMMARY OF THE INVENTION

Broadly speaking the phase sensitive detector of this invention employs a first differential amplifier which has the input signal connected across its input terminals. Each of the output terminals of this differential amplifier is connected through solid state switching devices to a pair of load elements, which typically would take the form of load resistors. The solid state switching devices are controlled by the output of a second differential amplifier which has a reference signal coupled across its input terminals. The circuit arrangement is such that, depending upon the polarity of the reference signal, each output terminal from the first differential amplifier is connected to one or the other of the load elements. Thus as the polarity of the reference signal changes the load elements are switched between the two output terminals from the first differential amplifier. The difference between the voltages appearing across the two loads then serves as the output signal which is linearly related in amplitude to that component of the input signal which is in phase with the reference signal. If the action of the solid state devices is maintained within the region of linear modes of operation this circuit can respond to a very wide range of input signal frequencies.

DESCRIPTION OF A PREFERRED EMBODIMENT

Figure 1:
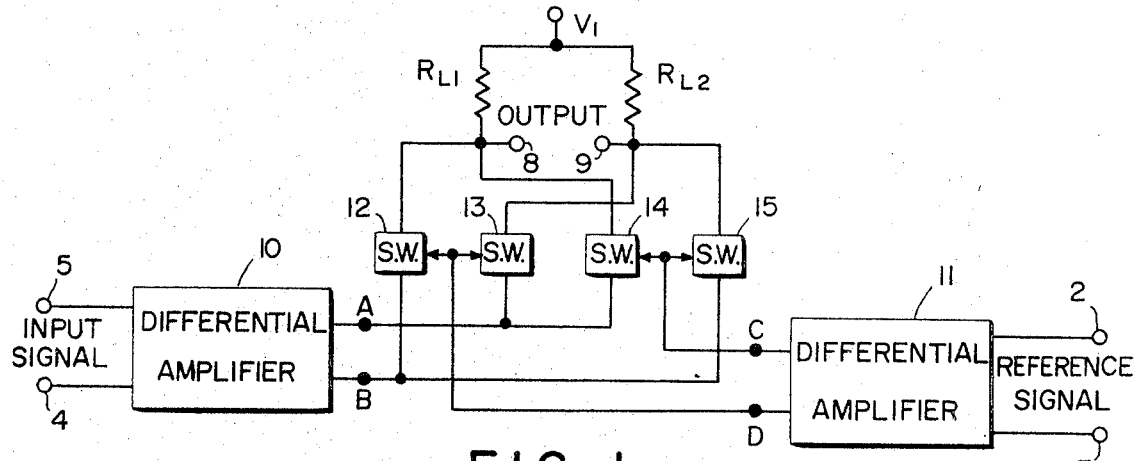
FIG. 1 is an illustration in block diagrammatic form of a phase sensitive detector constructed in accordance with the principles of this invention.

With reference now to FIG. 1, one embodiment of a phase sensitive detector in accordance with the principles of this invention is illustrated in block diagrammatic form. The signal to be phase detected is applied as an input signal at terminals 4 and 5 of a differential amplifier 10. This differential amplifier has a pair of output terminals A and B. A second differential amplifier 11 has a reference signal applied across its input terminals 2 and 3, with the output appearing on terminals C and D. Output terminal A of amplifier 10 is connected to one side of switches 13 and 14. Switches 13 and 14 are, typically, solid state switches, such as transistors operated in the linear mode, switch 13 being controlled by the output signal from terminal D of the second differential amplifier 11, while switch 14 is controlled by the signal from output terminal C of differential amplifier 11. The operation is such that switch 13 or switch 14 is closed when the connecting output terminal on the differential amplifier 11 is at a positive voltage with respect to the other terminal. In similar fashion output terminal B from differential amplifier 10 is connected to one side of switches 12 and 15 and these switches are again controlled by the signals from the output terminals D and C respectively of differential amplifier 11. Switches 12 and 14 have their other sides connected directly to one end of a load resistor $R_{L1}$ which is connected to a voltage reference point $V_1$ and switches 13 and 15 have their other side connected directly to one end of a second load resistor $R_{L2}$, the other end of which is also connected to voltage reference point $V_1$. Output terminal 8 is connected to the junction between load resistor $R_{L1}$ and switches 12 and 14 while output terminal 9 is connected to the junction between load resistor $R_{L2}$ and switches 13 and 15.

In operation, the varying wave form to be phase detected is applied to the input terminals 4 and 5 of differential amplifier 10 while the reference signal is applied to the input terminals 2 and 3 of differential amplifier 11. The polarity of the voltage between the terminals C and D of differential amplifier 11 determines which of the switches 12, 13, 14 and 15 are actuated and thus determines which one of the load resistors $R_{L1}$ or $R_{L2}$ is connected to terminals A and B of the differential amplifier 10. When the polarity of the voltage between the terminals C and D of amplifier 11 is positive the switches 14 and 15 are actuated thereby connecting the load $R_{L1}$ to terminal A of differential amplifier 10 and connecting the load $R_{L2}$ to terminal B of amplifier 10. Conversely when the polarity of the voltage between the terminals C and D is negative the switches 12 and 13 are actuated and load $R_{L1}$ is coupled to terminal B of amplifier 10 while load $R_{L2}$ is connected to terminal A of that amplifier. The action of the circuit is such that when the wave form at input 4 and 5 is in phase with the reference wave form applied between terminals 2 and 3, the circuit will act as a full wave rectifier for the input signal at terminals 4 and 5 with the rectified voltage appearing between output terminals 8 and 9. The magnitude of the output voltage will, of course, depend upon the gain of differential amplifier 10 as well as the values of the load resistors $R_{L1}$ and $R_{L2}$. Should the input voltage at terminals 4 and 5, however, be 180° out of phase with the reference voltage, the output signal at terminals 8 and 9 will have the same magnitude as it does in the in-phase case, but the polarity of the voltage will be reversed. When the input voltage at terminals 4 and 5 is 90° out of phase with the reference voltage, the average value of the signal appearing between terminals 8 and 9 will be zero.

Figure 2:
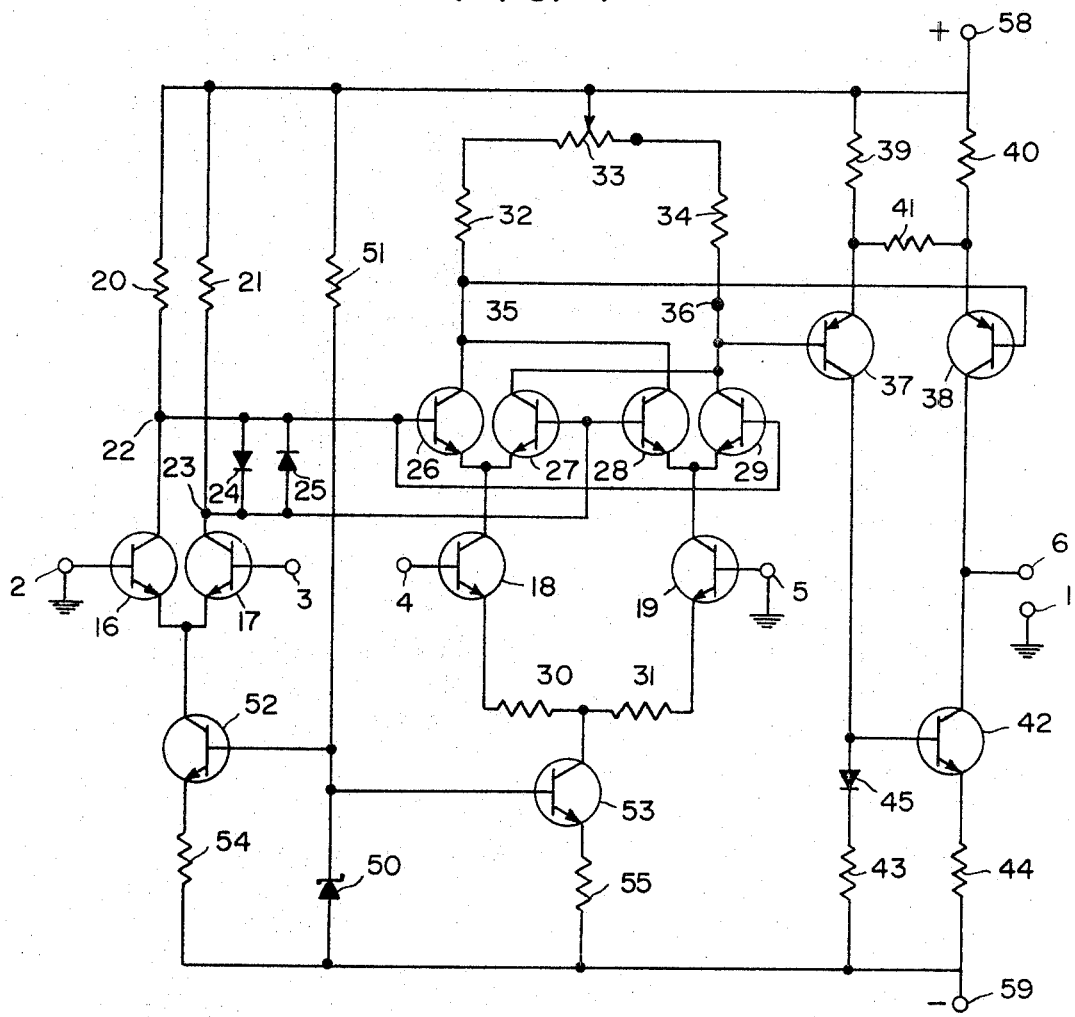
FIG. 2 is an illustration in schematic form of a preferred embodiment of a phase sensitive detector constructed in accordance with the principles of this invention.

In FIG. 2 there is shown a complete phase sensitive detector circuit constructed in accordance with the principles of this invention. In this circuit terminals 4 and 5 are again the input terminals across which the signal to be phase detected is applied and terminals 2 and 3 are the terminals across which the reference signal is coupled. Terminal 6 is one output terminal and terminal 1 is a common connection point for the circuit. A positive supply voltage is applied to the circuit at terminal 58 and a negative supply is connected to the circuit at terminal 59.

Transistors 16 and 17 together with their associated collector resistors 20 and 21 form a differential amplifier which amplifies the reference signal appearing between the terminals 2 and 3 and produces this amplified signal between terminals 22 and 23. The emitters of transistors 16 and 17 are series connected through transistor 52 and resistor 54 to the negative terminal 59. Transistor 52 in series with resistor 54 acts as a current regulator for transistors 16 and 17 and serves to minimize the dependence of the differential amplifier's operation on common mode signal voltages thereby providing that the amplifier is responsive only to the differential voltage appearing between the terminals 2 and 3. A diode 50, which typically would be a Zener diode having a breakdown voltage of about 6 volts, is connected in series with resistor 51 between the positive voltage terminal 58 and the negative terminal 59. The base of transistor 52 is connected to the junction between the resistor 51 and the diode 50, the diode 50 thereby maintaining a constant bias voltage at this base. A second differential amplifier includes transistors 18 and 19 together with their emitter resistors 30 and 31 and collector load resistors 32, 33 and 34. The input terminals 4 and 5 for the signal to be phase detected are connected directly to the bases of transistors 18 and 19 respectively. This differential amplifier also has its emitter resistors 30 and 31 connected to a current regulator stage formed of transistor 53 and resistor 55. The base of transistor 53 is, in this instance also, connected to the junction between diode 50 and resistor 51 as a constant source of bias voltage.

The collector of transistor 18 is connected to the emitters of a pair of transistors 26 and 27 which serve, in a manner which will hereinafter be explained, as switching elements for connecting this collector to either load resistor 32 or load resistor 34. Similarly transistors 28 and 29 have their emitters connected to the collector of transistor 19 and serve as switching elements for connecting that collector to either one of the load resistors 32 and 34. The collectors of transistors 29 and 27 are connected to terminal 36 which is at one end of resistor 34, the other end of that resistor being connected to one end of potentiometer resistor 33. The collectors of transistors 26 and 28 are connected to terminal 35 which is at one end of resistor 32 and the other end of resistor 32 is connected to the other side of potentiometer 33. The variable center tap of potentiometer 33 is connected directly to the positive supply voltage terminal 58. The bases of transistors 26 and 29 are connected to terminal 22 at the collector of transistor 16 while the bases of transistors 27 and 28 are connected to the terminal 23 at the collector of transistor 17. A pair of diodes 24 and 25 are connected in parallel opposition between terminals 22 and 23 and serve to limit the voltage excursion between these terminals thereby preventing breakdown of the junctions between the emitters and bases of the transistors 26, 27, 28 and 29 and also allowing the circuit to operate at relatively high frequencies.

The gain of the differential amplifier which includes transistors 18 and 19 is determined by the ratio of the value of collector resistors 32, 33, and 34 to the value of the emitter resistors 30 and 31. By increasing the value of the emitter resistors 30 and 31, the voltage gain of the amplifier is decreased, achieving, however, a higher degree of linearity and stability. The potentiometer 33 provides a variable for adjustment between the two halves of the differential amplifier to compensate for slight differences in the emitter and collector resistors or in transistors 18 and 19.

Transistors 37 and 38 form a third differential amplifier stage for generating an output current from terminal 6 which is referenced to the common terminal 1 of the circuit. Emitter resistors 39 and 40 are connected between the positive supply terminal 58 and the emitters of these two transistors to provide the appropriate bias voltages. Resistor 41 which is connected between the emitters of transistor 37 and transistor 38 controls the gain of this differential amplifier stage. The base of transistor 37 is connected directly to terminal 36 while the base of transistor 38 is connected to terminal 35. A transistor 42 is connected in series with resistor 44 between the negative supply terminal and terminal 6. The base of this transistor 42 is connected directly to the collector of transistor 37 and through diode 45 and resistor 43 to the negative supply terminal 59. The transistor 42 provides a high impedance load for the collector of transistor 38 so that the current output of the circuit is proportional to the voltage input thereby permitting the overall voltage gain of the circuit to be adjusted by selection of the output load resistor placed between terminals 6 and 1. The resistors 43 and 44 are of equal value and are used to balance the collector current of transistor 37 and transistor 38. The diode 45 compensates for the voltage drop between the base and emitter of transistor 42.

This arrangement is such that a balance of current is maintained between the collector currents of transistors 37 and 38 over even a fairly wide range of voltages applied between terminals 58 and 59. Since the bias voltages applied to current regulators 52 and 53 are regulated by Zener diode 50, the entire circuit is relatively independent of variations in supply voltage and may be operated with a number of different and poorly regulated voltage supplies.

In operation the reference signal applied between the terminals 2 and 3 is amplified and appears between terminals 22 and 23, the magnitude of the voltage between terminals 22 and 23 being limited by the action of diodes 24 and 25. This limitation of amplitude permits high frequency operation and prevents breakdown of the emitter-base junction of NPN transistors 26, 27, 28 and 29. This amplified reference signal serves to control the transistors 26, 27, 28 and 29 which act as switches, switching the collectors of transistors 18 and 19 between load resistors 32 and 34. Thus, if the polarity of the reference signal is such that terminal 23 is more positive than terminal 22, then transistors 27 and 28 will be biased into the conducting state thereby coupling the collector of transistor 18 with load resistor 34 at junction 36 and coupling the collector of transistor 19 with load resistor 32 at junction 35. Since the signal to be phase detected is applied between terminals 4 and 5, then the switching action results in the generation of a differential voltage across resistors 32 and 34 which is proportional to that component of the alternating voltage signal applied to terminals 4 and 5 which is of the same frequency and phase as the reference voltage applied between terminals 2 and 3. The switching transistors 26, 27, 28 and 29 are kept within their linear mode of operation which allows this circuit to operate over a very wide range of signal frequencies without further circuit adjustments. Since the circuit as is illustrated in FIG. 2 is a direct coupled circuit, it will operate down to very low frequencies. The circuit has been found to have an operating range from frequencies of 1 hertz to 20 megahertz.

In FIG. 3 there are illustrated wave forms at various points and for various conditions within the circuit. The horizontal time scale is the same for all of the wave forms in FIG. 3. The vertical coordinate for each of the wave forms shown is a voltage scale and the dotted line indicates the zero voltage value. In FIG. 3a, there is illustrated a typical voltage wave form applied to the reference terminals 2 and 3, while in FIG. 3b the resulting wave form is shown as it appears between terminals 23 and 22. In FIG. 3c there is shown a wave form applied as an input signal between terminals 4 and 5 and FIG. 3d shows the output wave form between terminals 6 and 1 resulting from the application of the input wave form shown in FIG. 3c while the reference wave form shown in FIG. 3a was being applied. Since the signal voltage applied between terminals 4 and 5 is in phase with the reference voltage applied between terminals 2 and 3, the output current shown in FIG. 3d is of positive polarity. The average value of this current will, of course, be proportional to the amplitude of the signal voltage.

Figure 3A:
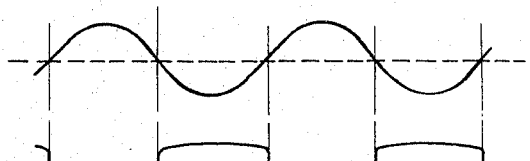
FIGS. 3a, 3b, 3c, 3d, 3e, 3f, 3g, and 3h are graphical illustrations of wave forms that appear at various points in the circuit illustrated in FIG. 2.
Figure 3B:
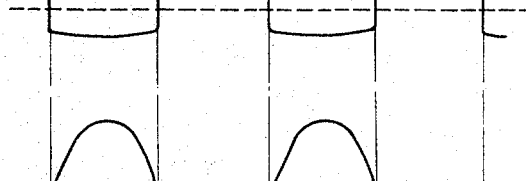
Figure 3C:
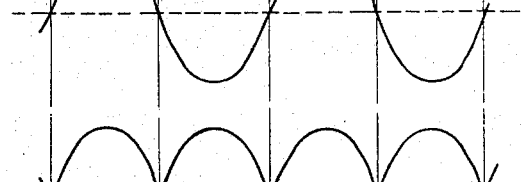
Figure 3D:
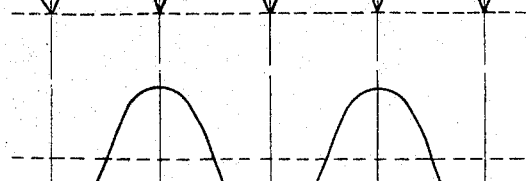
Figure 3E:
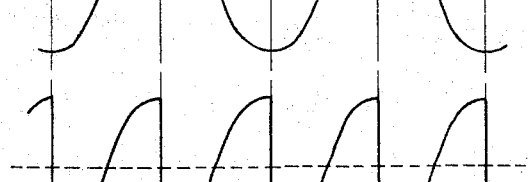
Figure 3F:
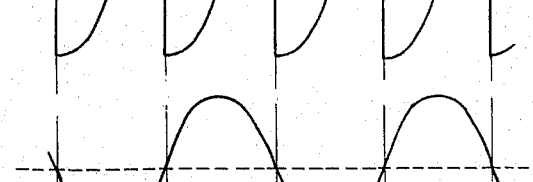
Figure 3G:
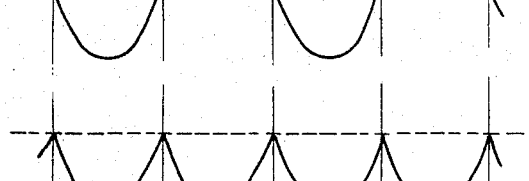
Figure 3H:
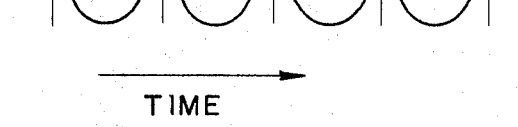

When the wave form applied to the input terminals 4 and 5 is as shown in FIG. 3e, that is 90° out of phase with the reference voltage as shown in FIG. 3a, then the output signal between terminals 6 and 1 has the form shown in 3f. It will be noted that this output current has an average value of zero. In FIG. 3g, there is illustrated still another input voltage applied between terminals 4 and 5 and, in this instance, the input voltage is 180° out of phase with reference voltage as shown in FIG. 3a. The resultant output voltage appearing between terminals 6 and 1 is then illustrated in FIG. 3h and can be seen to have a negative polarity.

In the circuit configuration illustrated in FIG. 1 bipolar transistors have been shown, however, field effect transistors may be substituted for these bipolar transistors and the circuit should perform satisfactorily with either junction field effect transistors or metal oxide semiconductor field effect transistors. Additionally any NPN transistors shown in FIG. 1 may be replaced by PNP transistors and vice versa without adverse effects on the circuit operation.

The invention having been described various modifications and improvements will now occur to those skilled in the art and the invention should be construed as limited as only by the spirit and scope of the appended claims.

I claim:

1. A phase sensitive detector for providing an output signal having an amplitude related to the amplitude of only that component of a varying input signal which is in phase with a varying reference signal comprising:
   a first differential amplifier having first and second output terminals, said reference signal being applied as an input to said first differential amplifier,
   a second differential amplifier, said second differential amplifier having first and second amplifying elements and first and second resistive loads, and
   switch means responsive to the output signal appearing across said first and second output terminals of said first differential amplifier for switching said first and second resistive loads between said first and second amplifying elements in said second differential amplifier, said first resistive load being coupled to said first amplifying element and said second resistive load being coupled to said second amplifying element when the voltage between said first and second output terminals of said first differential amplifier has one polarity and said second resistive load being coupled to said first amplifying element and said first resistive load being coupled to said second amplifying element when the output voltage between said first and second output terminals on said first differential amplifier is of opposite polarity, the differential voltages across said first and second resistive loads serving as an output signal.

2. A phase sensitive detector in accordance with claim 1 wherein said switching means comprises first, second, third, and fourth transistor elements, said transistor elements being operated within their linear mode.

3. A phase sensitive detector in accordance with claim 2 wherein said second differential amplifier includes a first transistor serving as said first amplifying element and a second transistor serving as said second amplifying element one terminal of said first transistor being coupled through said first switching transistor element to said first load and the same terminal of said first amplifier transistor being coupled through said second switching transistor element to said second load, one terminal of said second amplifier transistor being connected through said third switching transistor element to said first load and the same terminal of said second amplifying transistor being coupled through said fourth switching transistor element to said second resistive load, said resistive loads being connected at the other end thereof to a supply voltage, said first and fourth switching transistor elements being actuated in conjunction with one another and said second and third switching transistor elements being actuated in conjunction with one another.

4. A phase sensitive detector in accordance with claim 3 wherein said first differential amplifier includes diode limiting means coupled between its output terminals whereby the amplitude of the voltage appearing across said first amplifier output terminals is limited, said first output terminal being connected to the bases of said first and fourth switching transistor elements and said second output terminal being connected to the bases of said second and third switching transistor elements.

5. A phase sensitive detector in accordance with claim 4 and further including a third differential amplifier having one input terminal connected between said first load and said first switching transistor element and its second input terminal connected between said second resistive load and said fourth switch transistor element, said third differential amplifier providing a high impedance current output, the value of said output current from said third differential amplifier being directly related to the differential voltage appearing across said first and second loads.

6. A phase sensitive detector in accordance with claim 5 and further including a voltage regulating element for controlling the bias voltages applied to said first and second amplifiers and means in said third differential amplifier for maintaining a zero output current for a zero differential voltage appearing across said first and second loads, even when supply voltages for said third amplifier are varying.

References Cited

UNITED STATES PATENTS 3,241,078   3/1966   Jones _____ 328—133 XR
3,330,972   7/1967   Malan _____ 307—323 XR DONALD D. FORRER, Primary Examiner J. ZAZWORSKY, Assistant Examiner U.S. Cl. X.R.

324—83; 328—109; 329—50